United States Patent
Chen et al.

(10) Patent No.: US 7,818,476 B2
(45) Date of Patent: Oct. 19, 2010

(54) DIRECT MEMORY ACCESS CONTROLLER WITH DYNAMIC DATA TRANSFER WIDTH ADJUSTMENT, METHOD THEREOF, AND COMPUTER ACCESSIBLE STORAGE MEDIA

(75) Inventors: Yu-Shu Chen, Hsinchu (TW); Jhen-Ji Tu, Taipei (TW); Chan-Hao Chang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 305 days.

(21) Appl. No.: 11/829,950

(22) Filed: Jul. 29, 2007

(65) Prior Publication Data

US 2008/0243757 A1  Oct. 2, 2008

(30) Foreign Application Priority Data

Mar. 27, 2007  (TW) .............................. 96110486 A

(51) Int. Cl.
*G06F 13/00*  (2006.01)
*G06F 13/28*  (2006.01)
*G06F 12/00*  (2006.01)

(52) U.S. Cl. ............................. 710/33; 710/22; 710/26; 710/34; 711/100

(58) Field of Classification Search .................. 710/22, 710/26, 33, 34; 711/100
See application file for complete search history.

(56) References Cited

U.S. PATENT DOCUMENTS

| | | | |
|---|---|---|---|
| 4,878,166 A * | 10/1989 | Johnson et al. | ............. 710/307 |
| 5,628,026 A | 5/1997 | Baron et al. | |
| 5,901,100 A * | 5/1999 | Taylor | ....................... 365/219 |

FOREIGN PATENT DOCUMENTS

EP           997822 A2 *    5/2000

* cited by examiner

*Primary Examiner*—Alford W Kindred
*Assistant Examiner*—Farley J Abad
(74) *Attorney, Agent, or Firm*—Jianq Chyun IP Office

(57) ABSTRACT

A method of dynamic data transfer width adjustment is provided. The method includes firstly detects a data size of a transfer data. A data transfer width mode is detected according to a data address of transferring data. The data transfer width mode includes at least one of a word mode, a half-word mode, and a byte mode. According to the data address, the data transfer width mode, and the data size, the data is transferred.

11 Claims, 5 Drawing Sheets

DIRECT MEMORY ACCESS CONTROLLER WITH DYNAMIC DATA TRANSFER WIDTH ADJUSTMENT, METHOD THEREOF, AND COMPUTER ACCESSIBLE STORAGE MEDIA

CROSS-REFERENCE TO RELATED APPLICATION

This application claims the priority benefit of Taiwan application serial no. 96110486, filed Mar. 27, 2007. All disclosure of the Taiwan application is incorporated herein by reference.

BACKGROUND OF THE INVENTION

1. Field of the Invention

The present invention relates to a direct memory access controller (DMAC). More particularly, the present invention relates to a DMAC with dynamic data transfer width adjustment.

2. Description of Related Art

A next-generation electronic product gradually becomes light, thin, short, small, and low power consumption. As a result, a System-on-Chip (SoC) is a hot research topic. Digital signal processing and multimedia processing become a main load of overall operation in the application of most electronic devices. Furthermore, the data transfer rate is a key issue in multi-media application.

Currently, a direct memory access controller (DMAC) has been widely used in the data transfer because the DMAC can be used to transfer data between a peripheral device and a memory independently and a processor does not directly participate in the data transfer throughout the process. Furthermore, when a significant amount of data is to be transferred, the DMAC can complete the data transfer just by setting parameters of the DMAC. At the same time, the processor can execute other operation in parallel. Therefore, the DMAC may not only save the additional time of the processor to transfer data, but also enhance system performance.

In current multi-media applications, such as MPEG-4 and H.264 standards, the algorithms include motion estimation, motion compensation, and the like. In practice, based on these algorithms, not only a large amount of data needs to be transferred, but also data addresses of the data to be transferred are often distributed in discontinuity.

A conventional data transfer width mode includes a word mode, a half-word mode, and a byte mode. A conventional data transfer mode adopts an aligned mode with a fixed width. This transfer mode requires determining which data transfer width mode is used before the data is transferred. During the transfer of data, the data transfer width mode cannot be changed. For example, if the word mode is chosen as the data transfer width mode initially, the data will be transferred in the word mode throughout the data transfer period.

FIG. 1 shows a conventional data transfer mode. Each grid in FIG. 1 stands for a byte of data. In the conventional method of transferring data A1-A7, the data transfer width mode must be determined initially. If the word mode (four bytes as a transfer unit each time) is employed as the data transfer width mode, three steps (i.e., three times) are required to complete the transfer of the data A1-A7, i.e., Steps S101, S102, and S103.) In FIG. 1, it is apparent that after the data A1-A7 is transferred, redundant data B1-B5 must be discarded, resulting in a waste of time. If a user intends to simplify the transfer mode, the byte mode (one byte as the transfer unit each time) is used as the data transfer width mode. However, if the byte mode is used as the data transfer width mode, seven steps (i.e., seven times) are required to complete the transfer of the data A1-A7. Although choosing the byte mode as the data transfer width mode is the simplest way, the byte mode is not the most efficient mode.

In the technology disclosed in U.S. Pat. No. 5,628,026, a counter circuit is utilized to realize the direct memory access controller (DMAC) which can execute multi-dimensional data transfer. In this publication, the total length of the transfer data must be just equal to DCOH×DCOM×DCOL, where DCOL, DCOM, and DCOH are the lengths of the data in the first dimension, the second dimension, and the third dimension, respectively. However, in actual application, not all of data lengths can meet such a requirement.

SUMMARY OF THE INVENTION

The present invention is directed to a method of dynamic data transfer width adjustment for enhancing data transfer efficiency.

The present invention is also directed to a computer accessible storage medium, which can execute each step of the schedule control method of the operation flow.

The present invention is also directed to a direct memory access controller (DMAC) with dynamic data transfer width adjustment, which can dynamically select an optimum data width as the data transfer width mode.

In order to solve the aforementioned problems of the conventional art described above, the present invention provides a method of dynamic data transfer width adjustment. First, the total data size of the transfer data is detected. The data transfer width mode of the transfer data is determined according to the data address of the transfer data. The data transfer width mode includes a first transfer mode and a second transfer mode. According to the data address, the data transfer width mode, and the total data size of the transfer data, the data is transferred.

The present invention is directed to a computer accessible storage medium for storing a computer program. The computer program is loaded into a computer system so that the computer system executes any of steps of the schedule control method of the operation flow.

The direct memory access controller (DMAC) with dynamic data transfer width adjustment provided by the present invention includes a source address and width generator (SAWG), a destination address and width generator (DAWG), and a first in first out (FIFO) buffer. The SAWG is used to transfer a source data address and a source data width of the transfer data. The DAWG is used to transfer a destination data address and a destination data width of the transfer data. The FIFO buffer is coupled to the SAWG and the DAWG, so as to temporarily store the transfer data. Furthermore, in the transfer mode of transfer data, a data transfer width mode of the transfer data is determined according to the data address of the transfer data, and the data transfer width mode includes a first transfer mode and a second transfer mode.

In view of the above, in the present invention, the data transfer width mode of the transfer data is determined according to the data address of the transfer data. Therefore, the method of dynamic data transfer width adjustment and the DMAC provided by the present invention may use the optimum data transfer width, thereby not only enhancing the transfer efficiency, but also meeting practical requirements.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
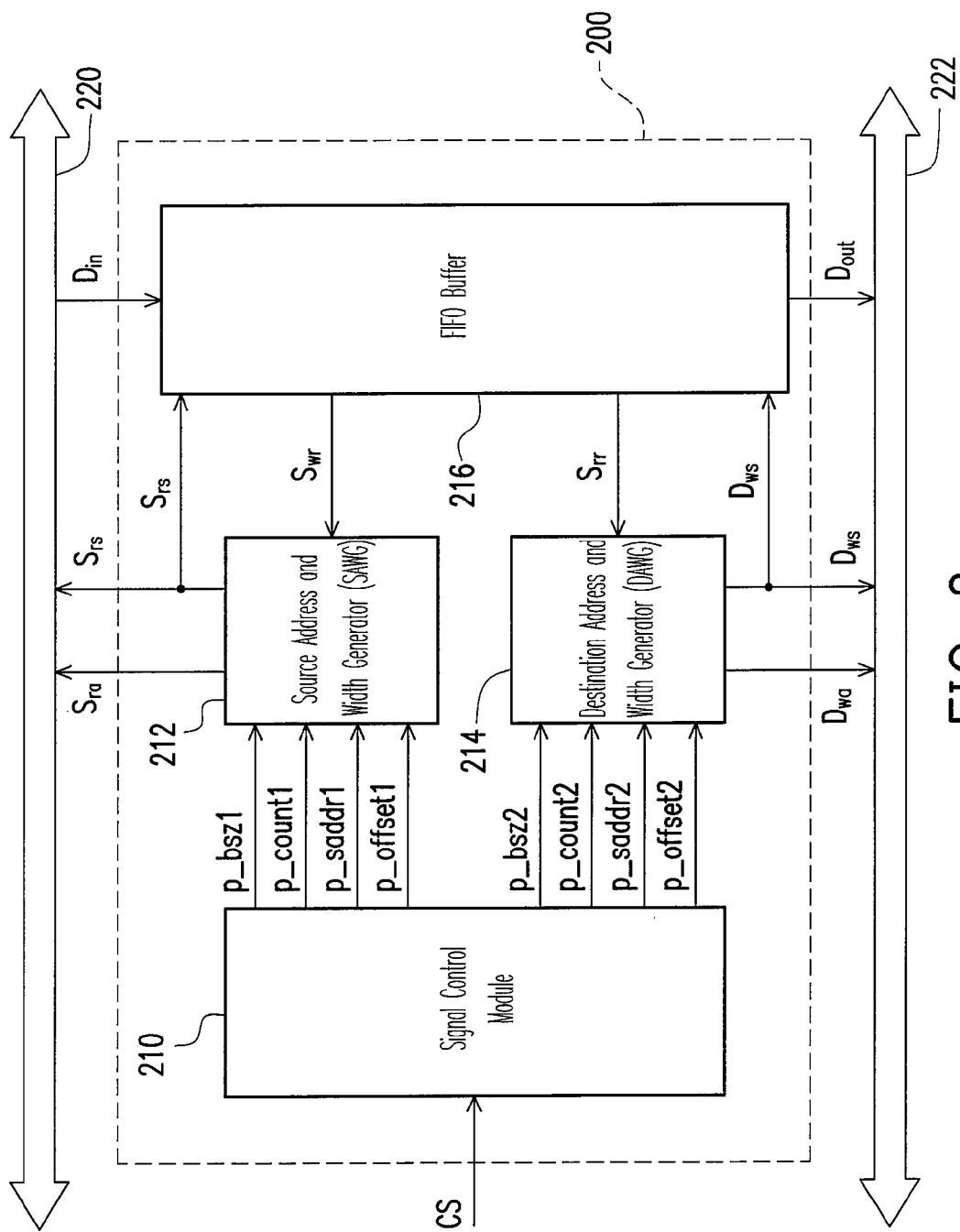
FIG. 2 is a circuit diagram of a direct memory access controller (DMAC) with dynamic data transfer width adjustment according to an embodiment of the present invention.

FIG. 2 is a circuit diagram of a direct memory access controller (DMAC) with dynamic data transfer width adjustment according to an embodiment of the present invention. Referring to FIG. 2, the DMAC 200 with dynamic data transfer width adjustment in this embodiment includes a source address and width generator (SAWG) 212, a destination address and width generator (DAWG) 214, a signal control module 210, and a first in first out (FIFO) buffer 216. The signal control module 210 is coupled to the SAWG 212 and the DAWG 214. The SAWG 212 and the DAWG 214 are coupled to the FIFO buffer 216, respectively. Hereafter, the SAWG 212 read the transfer data from the source end 220 and write it to the FIFO buffer 216 if there is a sufficient space in FIFO buffer 216, and the DAWG 214 read the transfer data from the FIFO buffer 216 and write it to the destination end 222 if there is a sufficient data in the FIFO buffer 216.

When the signal control module 210 receives a control signal CS from the previous level, for example, a control signal of a central processor unit (CPU) (not shown), it indicates that the data is to be transferred. At this time, the signal control module 210 transfers a plurality of parameter settings to the SAWG 212 and the DAWG 214. In this embodiment, the SAWG 212 includes a plurality of registers to store the plurality of parameter settings provided by the signal control module 210. The parameter settings include a total transfer data size p_bsz1, a data size p_count1 of a continuous data segment, a start data address p_saddr1 of the transfer data, and a spacing p_offset1 of the start addresses of adjacent continuous data segments.

The SAWG 212 is used to transfer the source data address Sra to the source end 220, and transfer the source data width Srs to the source end 220 and the FIFO buffer 216. At this time, the input data Din provided by the source end can be temporarily stored in the FIFO buffer 216. In addition, the FIFO buffer 216 adjusts the data width of output data Dout transferred to a destination end 222 according to the control of the DAWG 214. For example, when the FIFO buffer 216 outputs a word (i.e., four bytes) data to the destination end 222 according to the control of the DAWG 214, if only one byte of the input data is temporarily stored in the FIFO buffer 216, the FIFO buffer 216 will wait for the next input data Din being written. Until the quantity of temporarily stored data is enough, the data Dout with the data width of word is output to the destination end 222.

Referring to FIG. 2, similarly, in this embodiment, the DAWG 214 includes a plurality of registers to store the parameter settings including the total transfer data size p_bsz2, the data size p_count2 of a continuous data segment, the start data address p_saddr2 of the transfer data, and a spacing p_offset2 between the start addresses of adjacent continuous data segment, etc. provided by the signal control module 210. Furthermore, the DAWG 214 is used to transfer a destination data address Dwa to the destination end 222, and transfer the destination data width Dws to the destination end 222 and the FIFO buffer 216.

It should be noted that, in this embodiment, the SAWG 212 and the DAWG 214 transfer data in nonaligned mode. The nonaligned mode dynamically determines the data transfer width mode of the transfer data according to the data address of the transfer data. The data transfer width mode can include a first transfer mode and a second transfer mode, and can further include a third transfer mode, and also may include more than three transfer modes. For example, the dynamically determined data transfer width mode can include one or more of a word mode (i.e., four bytes as a transfer unit each time), a half-word mode (i.e., two bytes as a transfer unit each time), and a byte mode (i.e., one byte as a transfer unit each time). In this embodiment, if the largest width of a data bus is one word, the data transfer width mode includes a word mode, a half-word mode, and a byte mode.

The priority of the dynamically determined data transfer width mode of transfer data is the word mode, then the half-word mode, and finally the byte mode. Suppose the largest width of the bus is 32 bits. When the data address of transfer data is at the word boundary, for example 0x0, 0x4, and 0x8, etc., the word mode is assigned to the data transfer width mode. When the data address of the transfer data is at the half-word boundary, for example, 0x2, 0x6, and 0xa, etc., the half-word mode is assigned the data transfer width mode. When the data address of the transfer data is at the byte boundary, for example, 0x1, 0x3, and 0x5, etc., the byte mode is assigned to the data transfer width mode.

Figure 3:
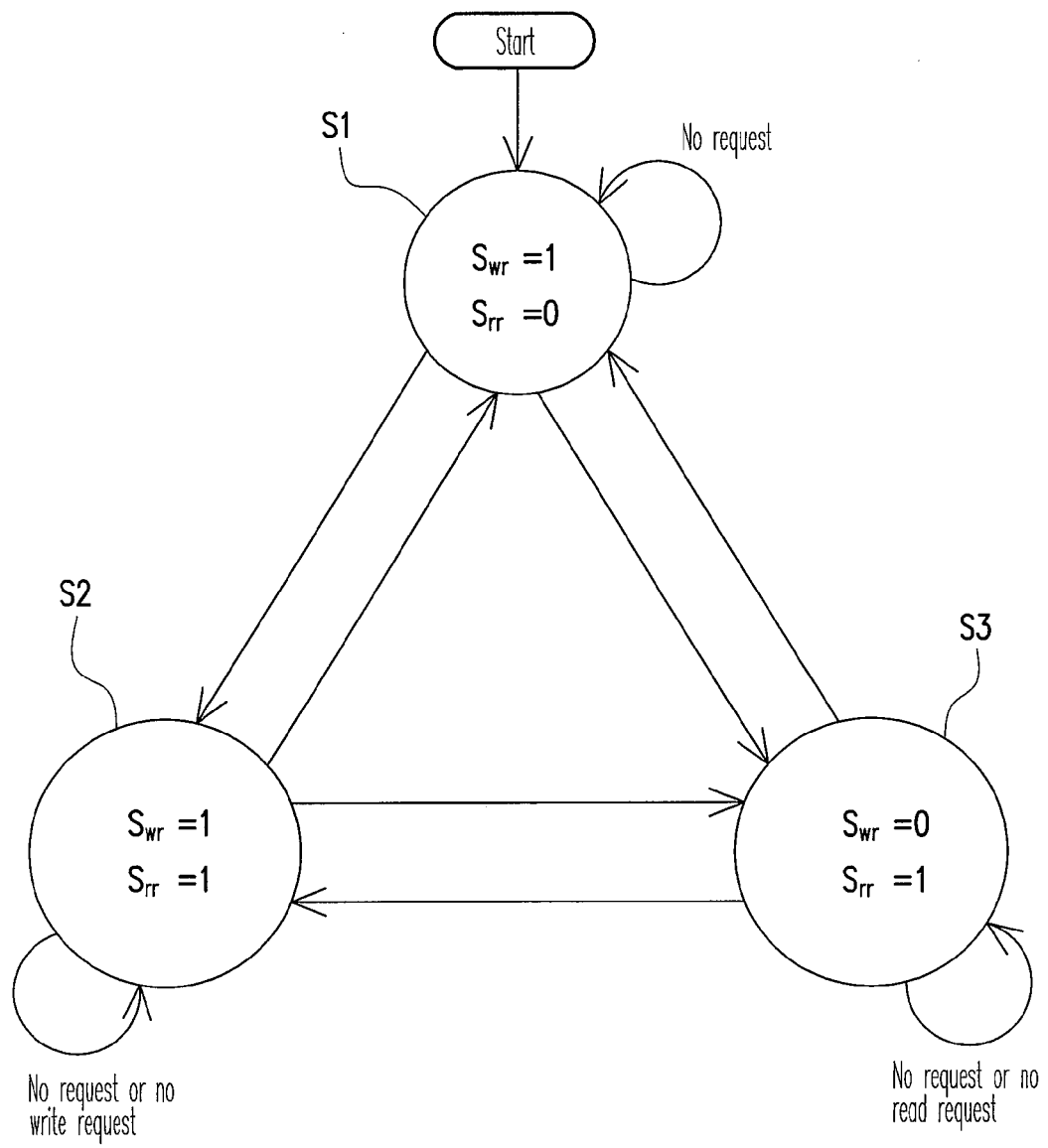
FIG. 3 is a view of a finite state machine of a first in first out (FIFO) buffer according to an embodiment of the present invention.

FIG. 3 is a view of a finite state machine of an FIFO buffer according to an embodiment of the present invention. Referring to FIGS. 2 and 3 together, the FIFO buffer 216 in this embodiment includes three states S1, S2, and S3. At the beginning, no data is stored in the FIFO buffer 216, so the buffer 216 operates in the state S1 and sets the signal Swr=1 (indicating that the FIFO buffer 216 has a sufficient space for the data to be written in). In addition, since the buffer 216 has no data to be output at present, the buffer 216 sets the signal Srr=0 (indicating that the FIFO buffer has no sufficient data to be outputted).

After the SAWG 212 sends a write request and writes the data Din to the buffer 216 from the source end 220, the buffer 216 determines to switch to the state S2 or S3 according to the remaining memory space. If the buffer 216 still has a sufficient memory space that has not been occupied, the buffer 216 operates in the state S2 and sets the signal Swr=1 and the signal Srr=1 (indicating that the FIFO buffer 216 temporarily stores sufficient data to be read and has sufficient data space to be written). In the state S2, the input data Din of the source end 220 can be written into the FIFO buffer 216, and the FIFO buffer 216 outputs the data Dout to the destination end 222 in response to the read request of the DAWG 214. Ideally, if the SAWG 212 sends a write request, the DAWG 214 sends a read request, and the two requests are balanced, the buffer 216 will keep operating in the state S2.

If the quantity of the output data Dout is larger than the quantity of the input data Din, the buffer 216 may switch to the state S1 when the buffer 216 cannot satisfy the read request from the DAWG 214. If the quantity of the input data Din is larger than the quantity of the output data Dout, the buffer 216 may switch to the state S3 due to the insufficient memory space.

In the state S3, the buffer 216 sets the signal Swr=0 (indicating that the FIFO buffer 216 has no sufficient space for the data to be written in) and sets the signal Srr=1. The buffer 216 will not operate until the DAWG 214 sends a read request to read the data in the buffer 216 and change to state S2 (or S1). If the signal Srr=1, it indicates that sufficient data is temporarily stored to be read in the FIFO buffer 216.

According to the present invention, embodiments of the schedule control method of the operation flow are provided. Those of ordinary skill in the art may realize the following embodiments in the form of a computer program, and use a computer accessible storage medium to store the computer program for a computer to execute, such that the method of dynamic data transfer width adjustment is accomplished by means of electronic automation. In the following embodiments, the DMAC is taken as example for illustrating the present invention, and the aforementioned figure is a circuit diagram of the DMAC with dynamic data transfer width adjustment.

Figure 4:
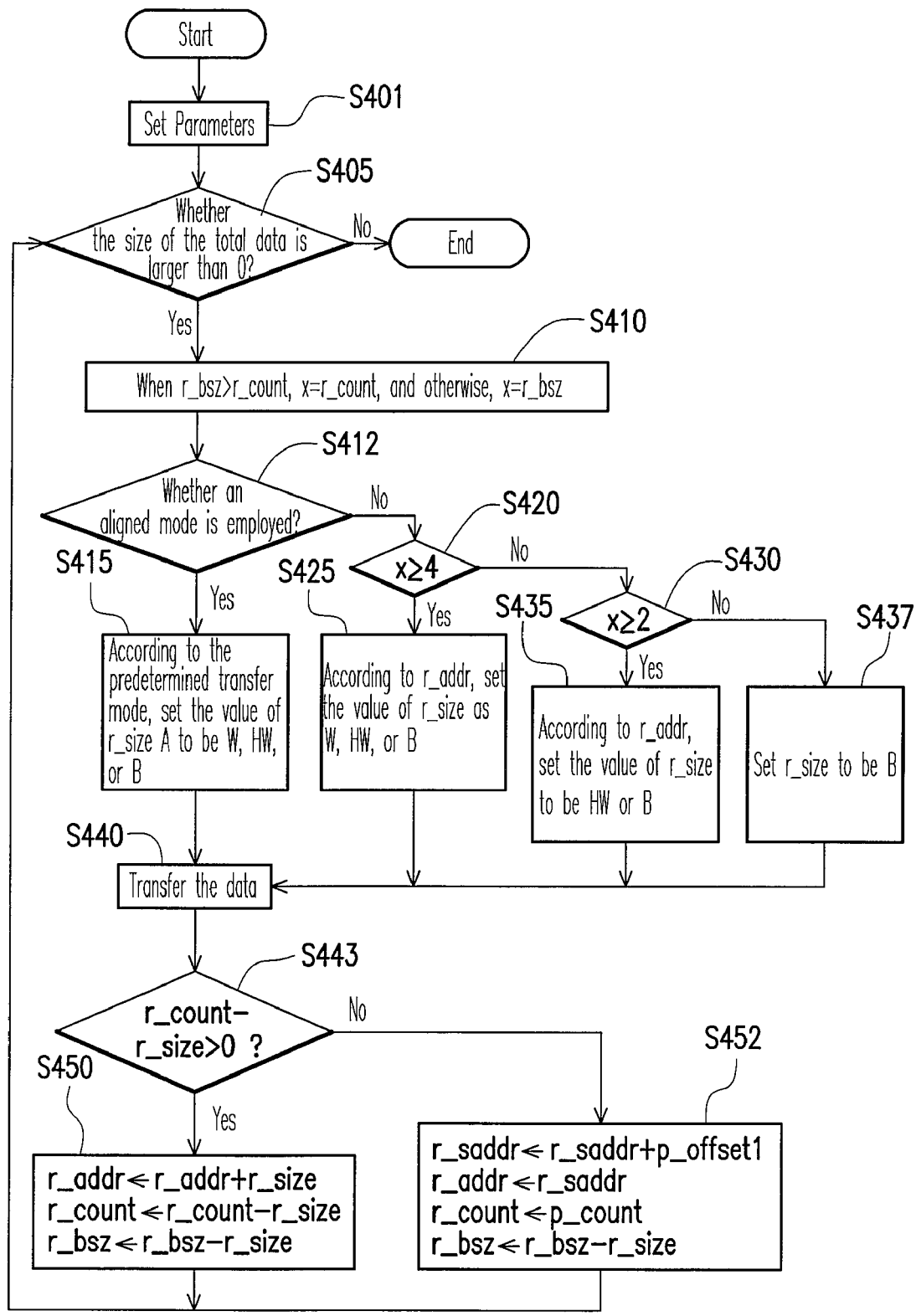
FIG. 4 is a flow chart of steps of a method of dynamic data transfer width adjustment according to an embodiment of the present invention.

FIG. 4 is a flow chart illustrating the process steps of dynamic data transfer width adjustment according to an embodiment of the present invention and it will be illustrated in detail below. The process of dynamic data transfer width adjustment provided in the present invention is applicable to the SAWG 212 and the DAWG 214, and the SAWG 212 is taken as an example. Referring to FIG. 4, as stated in Step S401, according to the parameters including the total transfer data size p_bsz1, the continuous data size p_count1 of the continuous data segment, and the start data address p_saddr1 of the transfer data, etc. provided by the signal control module 210, the initial values of each parameter registers are set.

r_bsz←p_bsz1
r_count←p_count1
r_saddr←p_saddr1
r_addr←p_saddr1 i.e., the total transfer data size p_bsz1 is written into the register r_bsz, the quantity p_count1 of the continuous data segment is written into the register r_count, and the start data address p_saddr1 is written into the registers r_saddr and r_addr.

Next, at Step S405, whether the content in the register r_bsz is greater than 0 is determined. If the register r_bsz=0, it indicates that the data transfer is completed, and then this DMA operation is ended. If the register r_bsz>0, Step S410 is executed.

In Step S410, if the value of the register r_bsz is larger than the value of the register r_count, it indicates that the last continuous data segment has not been processed at present. At present, set X=r_count. If the value of the register r_bsz is smaller than or equal to the value of the register r_count, it indicates that the continuous data segment processed at present is the last one. At this point, in Step S410, set X=r_bsz.

In the subsequent steps, the data transfer width mode of the transfer data is determined. In Step S412, it is determined whether or not to use an aligned mode. If the aligned mode is used, Step S415 is executed. If the nonaligned mode is used, Step S420 is executed. The nonaligned mode is a data transfer mode provided by the present invention. The nonaligned mode can enhance the data transfer efficiency, and will be illustrated in detail in the following embodiments.

Figure 1:
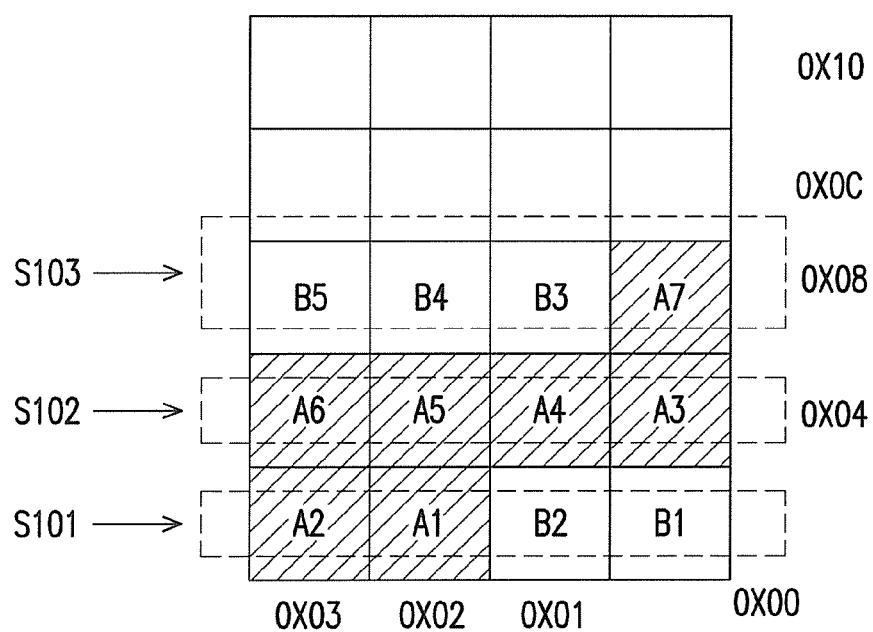
FIG. 1 shows a conventional data transfer mode.

In Step S420, it is determined whether X is larger than or equal to 4. If X is larger than or equal to 4 (indicating that the quantity of unprocessed data in the current continuous data segment is sufficient to use the word mode to transfer), Step S425 is executed. Otherwise, Step S430 is executed. In Step S425, it is determined whether the value of the register r_addr (standing for the address to be processed at present) is at the word boundary, the half-word boundary, or the byte boundary. Herein, if the largest width of a data bus is a word (i.e., four bytes), the definition of the boundary is illustrated with reference to FIG. 1. Considering that the largest data transfer amount is selected, if the address to be processed at present is 0x00 (or 0x04, 0x08, . . . ), it is an effective processing manner to access 4 batches of data B1, B2, A1 and A2 at a time. Therefore, if the address is 0x00, 0x04, 0x08, . . . , the word boundary is selected. If the address to be processed at present is 0x02 (or 0x06, 0x0a, . . . ), it is a better way to access 2 batches of data A1 and A2 at a time. Therefore, if the address is 0x02, 0x06, 0x0a, . . . , the half-word boundary is selected. Additionally, as for other addresses, the byte boundary is selected.

In this embodiment, in Step S425, if the last two bits of the value of the register r_addr are "00b," it is determined that the value of the register r_addr is at the word boundary. If the value of the register r_addr is at the word boundary, the SAWG 212 sets the register r_size=W (here, the value of W may be 4) in Step S425, such that the word mode is performed in the subsequent steps. In Step S425, if it is detected that the last two bits of the value of the register r_addr are "10b," it is determined that the value of the register r_addr is at the half-word boundary. If the value of the register r_addr is at the half-word boundary, the SAWG 212 sets the register r_size=HW (here, the value of HW may be 2) in Step S425, such that the half-word mode is performed in the subsequent steps. If in Step S425, it is detected that the last two bits of the value of the register r_addr are "01b" or "11b," it is determined that the value of the register r_addr is at the byte boundary. If the value of the register r_addr is at the byte boundary, the SAWG 212 sets the register r_size=B (herein, the value of B may be 1) in Step S425, such that the byte mode is performed in the subsequent steps.

In Step S430, it is determined whether X is larger than or equal to 2. If X is larger than or equal to 2 (indicating that the quantity of the unprocessed data in the current continuous data segment is sufficient to use the half-word mode to transfer), Step S435 is executed. Otherwise, Step S437 is executed. In Step S435, it is determined whether the value of the register r_addr is at the half-word boundary or the byte boundary. In this embodiment, in Step S435, it is examined whether the last one bit of the value of the register r_addr is "0b" or "1b" which determined that the value of the register r_addr is at the half-word boundary or the byte boundary. If the value of the register r_addr is at the half-word boundary, the SAWG 212 sets the register r_size=HW in Step S435, such that the half-word mode is performed in the subsequent steps. If the value of the register r_addr is at the byte boundary, the SAWG 212 sets the register r_size=B in Step S435, such that the byte mode is performed in the subsequent steps.

In Step S437, it indicates that X=1 at present (indicating that the quantity of the unprocessed data in the current continuous data segment is insufficient for using the word/half-word mode to transfer). Therefore, the SAWG 212 sets the register r_size=B in Step S437, such that the byte mode is performed in the subsequent steps.

After the register r_size has been set, Step S440 is executed. In Step S440, the data is transferred according to the contents of the register r_addr (i.e. the address to be processed at present) and the register r_size (indicating the size of the data to be accessed at present and also indicating the currently adopted data transfer width mode). Next, the SAWG 212 performs Step S443 to determine whether the value of r_count−r_size is larger than 0.

If the value of r_count−r_size at this time is 0, it indicates that the current continuous data segment has been transferred, so the SAWG 212 can perform Step S452. In Step S452, the SAWG 212 adds the value of the register p_offset1 to the register r_saddr, such that the start data address points to the next continuous data segment. In addition, the SAWG 212 further resets the registers r_addr and r_count (i.e., r_count←p_count1 and r_addr←r_saddr), so as to process the continuous data segment specified by the start data address r_saddr. Since, in Step S440, the specified quantity of data has been transferred according to the register r_size, the value r_size must be subtracted from the value r_bsz indicating the total date size of the current unprocessed data, so as to update the record of the total data size of the current unprocessed data.

In addition, if the value of the register r_count−r_size is larger than 0, it indicates that the current continuous data segment has not completely transferred, so the SAWG 212 performs Step S450. Since, in Step S440, the specified quantity of data has been transferred according to the register r_size, in Step S450, the value r_size must be added into the value r_addr (i.e., r_addr←r_addr+r_size), so as to update the address of the data to be processed currently. The SAWG 212 also subtracts the value r_size from the value of the register r_count (i.e., r_count←r_count−r_size) in Step S450, so as to update the data size of the unprocessed data in the current continuous data segment. In addition, the SAWG 212 also subtracts the value r_size from the value r_bsz indicating the total data size of the current unprocessed data (i.e., r_bsz←r_bsz−r_size) in Step S450, so as to update the record of the data size of the current unprocessed data.

In addition, if the signal control module 210 determines to use the aligned mode (i.e., in Step S412, it is determined to use the aligned mode) according to the control signal CS, the SAWG 212 performs Step S415. The SAWG 212 performs Step S415 according to the data transfer width mode specified by the signal control module 210. The determined data transfer width mode may be realized by any conventional art and the details will not be repeated herein. In Step S415, the SAWG 212 selects one data transfer width mode from the word mode, the half-word mode, and the byte mode according to the control of the signal control module 210, and sets the value r_size to be W, HW, or B according to the predetermined data transfer width mode. It should be noted that in the aligned mode (i.e., Step S415), once the data transfer width mode is determined at the very beginning of the transfer (i.e., Step S401), the same data transfer width mode must be used to complete the data transfer during the operation of DMA and the transfer mode cannot be dynamically switched.

Figure 5:
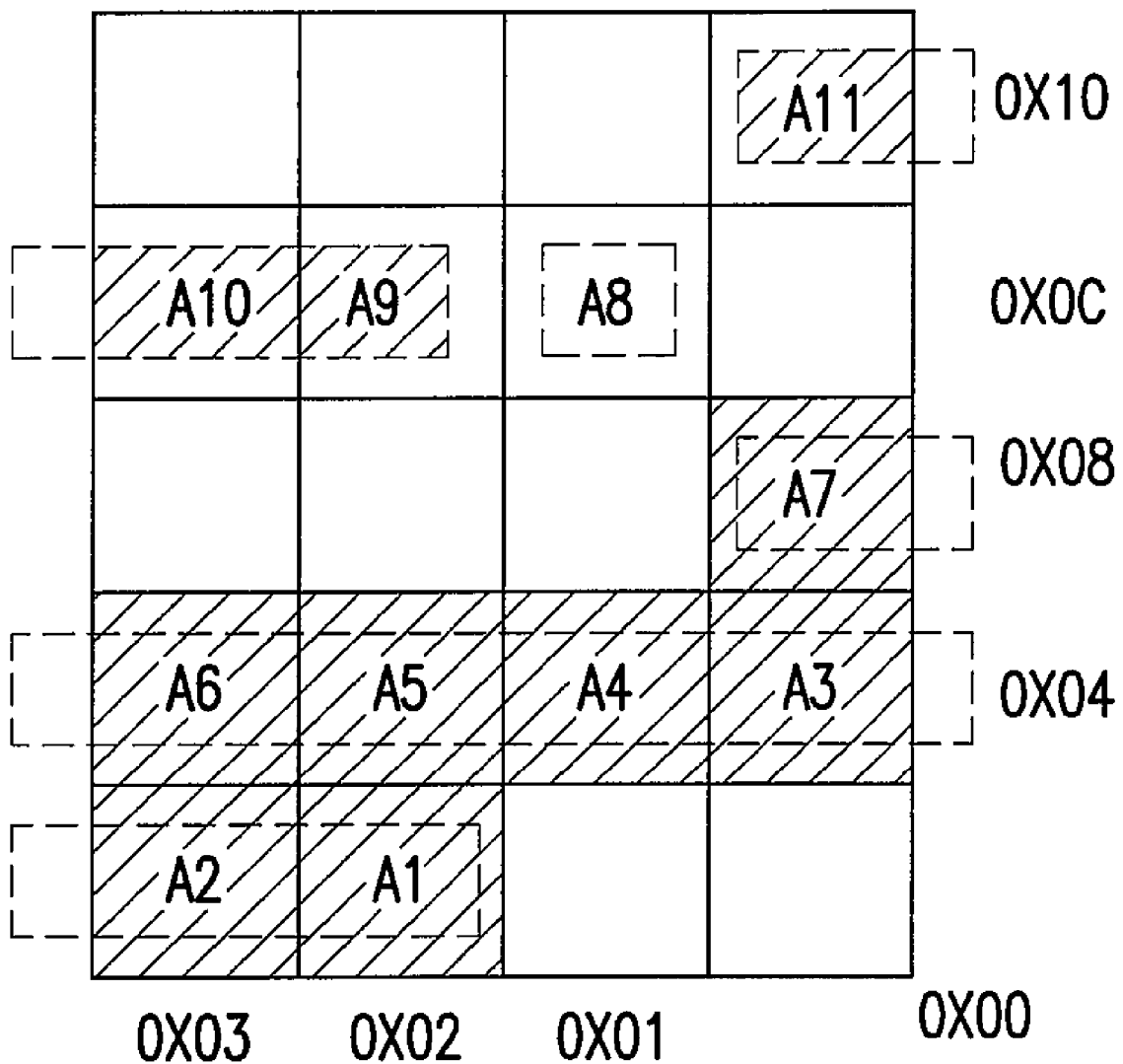
FIG. 5 shows a data transfer mode according to an embodiment of the present invention.

FIG. 5 shows the data transfer mode according to an embodiment of the present invention. In this embodiment, there are 11 batches of data (divided into two continuous data segments) in total to be accessed, and the address of the first batch of data (i.e., the data A1) is 0x02. The two continuous data segments are the data A1-A7 and the data A8-A11, respectively. The spacing of the start addresses between adjacent continuous data segments is 11, and the largest batch of data of the continuous data segment is 7. Referring to FIG. 4 and FIG. 5 together, as stated in Step S401, the parameter initial value of the registers are r_bsz=11, r_count=7, r_saddr=0x02, r_addr=0x02, and p_offset1=11. Next, Step S405 is executed to determine whether the total transfer data size r_bsz is larger than 0 (at this time, r_bsz=11). Therefore, Step S410 is executed. In Step S410, (r_bsz=11)>(r_count=7), so set X=r_count=7. Subsequently, Step S412 is executed. In this embodiment, it is assumed that the non-aligned mode is used to transfer data, so Step S415 will not be illustrated herein again.

As X=r_count=7 at present, enter Step S425. In Step S425, it is detected that the last two bits of the value of the register r_addr (0x02 at this time) are "10b", so it is determined that the value of the register r_addr is at the half-word boundary. Therefore, the SAWG 212 sets the register r_size=HW=2 in Step S425. In Step S440, the data A1-A2 is accessed according to the register r_addr (0x02 at this time) and the register r_size (2 at this time). After the Step S440, since the continuous data segment A1-A7 still has data that has not been processed, enter Step S450.

Since, in Step S440, a specified quantity of data has been transferred according to the register r_size, so in Step S450, the value r_size (2 at present) must be added into the value r_addr, so as to update the address r_addr=0x04 of the data to be processed at present. The value r_size is subtracted from the value of the register r_count, so as to update the size r_count=5 of the unprocessed data in the current continuous data segment. The value r_size is subtracted from the value r_bsz, so as to update the record r_bsz=9 of the total data size of the current unprocessed data.

Next, Step S405 is executed to determine whether the total transfer data size r_bsz is greater than 0 (at this time r_bsz=9). Therefore, Step S410 is executed. In Step S410, (r_bsz=9)>(r_count=5), so set X=r_count=5. Since X=r_count=5 at present, Step S425 is executed.

In Step S425, it is detected that the last two bits of the value (0x04 at this time) of the register r_addr are "00b", so it is determined that the value of the register r_addr is at the word boundary. Therefore, the SAWG 212 sets the register r_size=W=4 in Step S425. The data A3-A6 is accessed in Step S440 according to the register r_addr=0x04 and the register r_size=4. After Step S440, since the continuous data segment A1-A7 still has data that has not been processed, Step S450 is executed.

In Step S450, the r_size=4 is added into the value r_addr, so as to update the address r_addr=0x04+4=0x08 of the data to be processed at present. The value r_size is subtracted from the value of the register r_count so as to update the size r_count=5−4=1 of the unprocessed data in the continuous data segment. The value r_size is subtracted from the value r_bsz, so as to update the record of r_bsz=9−4=5 of the total data size of the current unprocessed data.

Next, Step S405 is executed to determine whether the total transfer data size r_bsz is larger than 0 (at this time, r_bsz=5). Next, Step S410 executed. In Step S410, (r_bsz=5)>(r_count=1), so set X=r_count=1. Since X=r_count=1 at present, Step S437 is executed. In Step S437, the register r_size=B=1 is set.

In Step S440, the data A7 is accessed according to the register r_addr=0x08 and the register r_size=1. After Step S440, since the continuous data segment A1-A7 has been processed, Step S452 is executed.

In Step S452, the value of the register p_offset1 is added into the register r_saddr (i.e., r_saddr=0x02+11=0x0d), such that the start data address points to the next continuous data segment A8-A11. The registers r_addr and r_count are reset, such that r_addr=r_saddr=0x0d and r_count=p_count=7. The value r_size is subtracted from the value r_bsz, so as to update the record r_bsz=5−1=4 of the total data size of the current unprocessed data.

Next, Step S405 is executed to determine whether the total transfer data size r_bsz is larger than 0 (at this time, r_bsz=4). Next, Step S410 is executed. In Step S410, (r_bsz=4)<(r_count=7), so set X=r_bsz=4. Since X=4 at present, Step S425 is executed.

In Step S425, it is detected that the last two bits of the value (0x0d at this time) of the register r_addr is "01b," so it is determined that the value of the register r_add is at the byte boundary. Therefore, the SAWG 212 sets the register r_size=B=1 in Step S425. In Step S440, the data A8 is accessed according to the register r_addr=0x0d and the register r_size=1. After Step S440, since the continuous data segment A8-A11 still has data that has not been processed, Step S450 is executed.

In Step S450, the r_size=1 is added into the value r_addr, so as to update the address r_addr=0x0d+1=0x0e of the data to be processed at present. The value r_size is subtracted from the value of the register r_count, so as to update the size r_count=7−1=6 of the unprocessed data in the current continuous data segment. The value r_size is subtracted from the value r_bsz, so as to update the record r_bsz=4−1=3 of the total data size of the current unprocessed data.

Next, Step S405 is executed to determine whether the total transfer data size r_bsz is larger than 0 (at this time, r_bsz=3). Next, Step S410 is executed. In Step S410, (r_bsz=3)<(r_count=6), so set X=r_bsz=3. Since X=3 at present, Step S435 is executed.

In Step S435, it is detected that the last one bit of the value (0x0e at this time) of the register r_addr is "0b", so it is determined that the value of the register r_addr is at the half-word boundary. Therefore, the SAWG 212 sets the register r_size=HW=2 in Step S435. In Step S440, the data A9-A10 is accessed according to the register r_addr=0x0e and the register r_size=2. After Step S440, since the continuous data segment A8-A11 still has data that has not been processed, Step S450 is executed.

In Step S450, the r_size=2 is added into the value r_addr, so as to update the address r_addr=0x0e+2=0x10 of the data to be processed at present. The value r_size is subtracted from the register r_count, so as to update the size r_count=6−2=4 of the unprocessed data in the current continuous data segment. The value r_size is subtracted from the value r_bsz, so as to update the record r_bsz=3−2=1 of the total data size of the current unprocessed data.

Next, Step S405 is executed to determine whether the total transfer data size r_bsz is larger than 0 (at this point, r_bsz=1). Next, Step S410 is executed. In Step S410, (r_bsz=1)<(r_count=4), so X=r_bsz=1 is set. Since X=1 at present, Step S437 is executed. In Step S437, the register r_size=B=1 is set.

In Step S440, the data A11 is accessed according to the register r_addr=0x10 and the register r_size=1. Since the r_bsz is 0 finally, the DMA operation is ended after the determination made in Step S405.

In the conventional art, if the data is written in the word mode, the data must be at the word boundary. However, in actual operation, not all data are at the word boundary. Therefore, in order to prevent the data from being overwritten, the data is usually written in the byte mode. However, the data written in the byte mode may waste a lot of time.

If the data is written in the memory by the nonaligned mode of the present invention, a suitable data transfer width mode can be selected dynamically according to the data address, thereby not only enhancing the writing efficiency, but also avoiding the problem of overwriting. The present invention can be realized by other embodiments. For example, another embodiment obtained by modifying the aforementioned embodiments is illustrated below. By modifying the aforementioned embodiments, the method of reading data from the source end at the nonaligned mode (nonaligned mode) is used for enhancement, so that the transfer efficiency can be enhanced by the modified implementation.

Referring to FIG. 2, as for the nonaligned mode, the action of reading the memory will not change the contents in the memory. According to the current standard, one of the "byte read," "half-word read," and "word read" must be selected in the bus. For example, in FIG. 1, if the data A1-A7 and the data B3-B4 from the source end 220 are to be read, the DMAC 200 can read the data from the source end 220 by the "word read" for three times. That is, the address Sra and width Srs of the source data appeared on the source end 220 are (0x00, word), (0x04, word), and (0x08, word). In practice, the address and width of the data transferred in the SAWG 212 are (0x02, halfword), (0x04, word), and (0x08, 3 bytes). The "3 bytes" is another data transfer width mode compared with the above modes, i.e., three bytes are used as a transfer unit each time.

Therefore, the SAWG 212 must mask the last two bits of the address transferred inside to be 00b and output it to the source end 220, i.e., all of them are alighted to the word boundary (therefore, 0x02→0x00, 0x04→0x04, 0x08→0x08). Thereafter, the data is transferred by means of "word read" between the source end 220 and the DMAC 200, resulting in (0x00, word), (0x04, word), and (0x08, word). (0x02, halfword), (0x04, word), and (0x08, 3 bytes) are actually transferred in the SAWG 212.

Next, for example, as shown in FIG. 5, the data A8-A11 is read, (0x0d, 3 bytes) and (0x10, byte) are transferred in the SAWG 212. However, the address Sra and width Srs of the source data transferred through the source end bus 220 are (0x0c, word) and (0x10, word). Therefore, in this embodiment, the SAWG 212 outputs an adjusted source data address Sra and width Srs to the source end 220 to obtain the data. Next, in the SAWG 212, the actually required data is temporarily stored in the FIFO buffer 216 according to the actual address and width. This method is used only when reading data. When the data is written into the destination end 222, the data must be written according to the dynamic adjustment method described in the aforementioned embodiment.

In view of the above, in the present invention, the data transfer width mode of transfer data is determined according to the data address of transfer data. Therefore, the method of dynamic data transfer width adjustment and the direct memory access controller (DMAC) provided by the present invention may use the optimum transfer data width. Thereby, not only the transfer efficiency may be enhanced, but also the actual requirements may be satisfied.

It will be apparent to those of ordinary skill in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of dynamic data transfer width adjustment, comprising:

setting a data size of a transfer data, wherein the transfer data includes a plurality of continuous data segments, and there is a non-transfer data between the continuous data segments;

setting a register r_addr for a data address of the transfer data;

setting a spacing between start addresses of adjacent continuous data segments of the continuous data segments;

setting a register r_count for a continuous data size of one of the continuous data segments;

determining a data transfer width mode of the transfer data according to the data address of the transfer data, wherein the data transfer width mode comprises a first transfer mode and a second transfer mode;

transferring the transfer data according to the data address, the data transfer width mode, and the data size of the transfer data;

detecting whether transfer of a continuous data segment of the plurality of continuous data segments is completed;

when the continuous data segment has not been transferred, the contents of the register r_addr is added with a width of a preceding transferred data;

when the continuous data segment has not been transferred, the width of the preceding transferred data is subtracted from the contents of the register r_count and the data size of the transfer data, respectively;

when the continuous data segment has been transferred, a start data address of the transfer data is added with the spacing between the start addresses of the adjacent continuous data segments, so as to transfer the next continuous data segment;

when the continuous data segment has been transferred, the start data address of the transfer data is written into the register r_addr, and the register r_count is reset; and when the continuous data segment has been transferred, the width of the preceding transferred data is subtracted from the data size of the transfer data.

2. The method of dynamic data transfer width adjustment as claimed in claim 1, wherein if the data size is 0, it is indicative that transfer of the transfer data is complete.

3. The method of dynamic data transfer width adjustment as claimed in claim 1, further comprising setting initial values of a plurality of parameters, wherein the parameters comprise a total data size, a source data address of the transfer data, a continuous data size of continuous data segment of the transfer data from a source end, a spacing between start addresses of adjacent continuous data segments of the transfer data from the source end, a destination data address of the transfer data, a continuous data size of the transfer data into a destination end, and a spacing between start addresses of adjacent continuous data segments of the transfer data into the destination end.

4. The method of dynamic data transfer width adjustment as claimed in claim 1, wherein the data transfer width mode further comprises a third transfer mode.

5. The method of dynamic data transfer width adjustment as claimed in claim 4, wherein the first transfer mode, the second transfer mode, and the third transfer mode are a word mode, a half-word mode, and a byte mode, respectively.

6. The method of dynamic data transfer width adjustment as claimed in claim 5, wherein the step of determining the data transfer width mode of the transfer data comprises:

using the word mode as the data transfer width mode when the contents of the register r_addr is at a word boundary;

using the half-word mode as the data transfer width mode when the contents of the register r_addr is at a half-word boundary; and using the byte mode as the data transfer width mode when the contents of the register r_addr is at a byte boundary.

7. A non-transitory computer accessible storage medium for storing a computer program, wherein the computer program is loaded into a computer system so that the computer system executes the method as claimed in claim 1.

8. A direct memory access controller (DMAC) with dynamic data transfer width adjustment, configured to:

set a data size of a transfer data, wherein the transfer data includes a plurality of continuous data segments, and there is a non-transfer data between the continuous data segments;

set a register r_addr for a data address of the transfer data;

set a spacing between start addresses of adjacent continuous data segments of the continuous data segments;

set a register r_count for a continuous data size of one of the continuous data segments;

determine a data transfer width mode of the transfer data according to the data address of the transfer data, wherein the data transfer width mode comprises a first transfer mode and a second transfer mode;

transfer the transfer data according to the data address, the data transfer width mode, and the data size of the transfer data;

detect whether transfer of a continuous data segment of the plurality of continuous data segments is completed;

when the continuous data segment has not been transferred, the contents of the register r_addr is added with a width of a preceding transferred data;

when the continuous data segment has not been transferred, the width of the preceding transferred data is subtracted from the contents of the register r_count and the data size of the transfer data, respectively;

when the continuous data segment has been transferred, a start data address of the transfer data is added with the spacing between the start addresses of the adjacent continuous data segments, so as to transfer the next continuous data segment;

when the continuous data segment has been transferred, the start data address of the transfer data is written into the register r_addr, and the register r_count is reset; and when the continuous data segment has been transferred, the width of the preceding transferred data is subtracted from the data size of the transfer data.

9. The DMAC with dynamic data transfer width adjustment as claimed in claim 8, further comprising a signal control module, so as to transfer information of the transfer data to a source address and width generator (SAWG) and a destination address and width generator (DAWG) of the DMAC.

10. The DMAC with dynamic data transfer width adjustment as claimed in claim 8, wherein the data transfer width mode comprises a third transfer mode.

11. The DMAC with dynamic data transfer width adjustment as claimed in claim 10, wherein the first transfer mode, the second transfer mode, and the third transfer mode are word mode, half-word mode, and byte mode, respectively.

* * * * *